United States Patent
Uhm et al.

(10) Patent No.: US 10,265,795 B2
(45) Date of Patent: Apr. 23, 2019

(54) METHOD FOR MANUFACTURING ELECTRICAL STEEL SHEET LAMINATED CORE HAVING REDUCED CORE LOSS AND INCREASED STRENGTH, AND LAMINATED CORE PRODUCED BY THE SAME

(71) Applicant: POSCO, Pohang-si (KR)

(72) Inventors: Sang-Ho Uhm, Incheon (KR); Chung-Ha Kim, Incheon (KR); Ji-Hyun Kim, Incheon (KR); Won-Seog Bong, Incheon (KR)

(73) Assignee: POSCO, Pohang-si (KR)

( * ) Notice: Subject to any disclaimer, the term of this patent is extended or adjusted under 35 U.S.C. 154(b) by 489 days.

(21) Appl. No.: 14/896,133

(22) PCT Filed: Dec. 24, 2013

(86) PCT No.: PCT/KR2013/012120
§ 371 (c)(1),
(2) Date: Dec. 4, 2015

(87) PCT Pub. No.: WO2015/002364
PCT Pub. Date: Jan. 8, 2015

(65) Prior Publication Data
US 2016/0121421 A1 May 5, 2016

(30) Foreign Application Priority Data
Jul. 3, 2013 (KR) ........................ 10-2013-0077901

(51) Int. Cl.
*B23K 9/23* (2006.01)
*B23K 9/16* (2006.01)
(Continued)

(52) U.S. Cl.
CPC ............. *B23K 9/164* (2013.01); *B23K 9/0035* (2013.01); *B23K 9/167* (2013.01); *B23K 9/173* (2013.01);
(Continued)

(58) Field of Classification Search
CPC ...... B23K 9/164; B23K 9/0035; B23K 9/167; B23K 9/173; B23K 9/23; B23K 35/3066;
(Continued)

(56) References Cited

U.S. PATENT DOCUMENTS 4,114,019 A * 9/1978 Sandor .................. B23K 9/025
219/137 R
5,472,772 A * 12/1995 Jones ..................... B23K 26/20
219/136
(Continued)

FOREIGN PATENT DOCUMENTS

CN 1489261 4/2004
CN 101214572 7/2008
(Continued)

OTHER PUBLICATIONS

International Search Report—PCT/KR2013/012120 dated Mar. 25, 2014.
(Continued)

*Primary Examiner* — Brian W Jennison
(74) *Attorney, Agent, or Firm* — Cantor Colburn LLP

(57) ABSTRACT

There are provided a method for manufacturing an electrical steel sheet laminated core having reduced core loss and improved strength, and a laminated core produced by the manufacturing method. The method includes: stacking electrical steel sheets to obtain a lamination; and welding an outer surface of the lamination, wherein during the welding, a welding wire having a resistivity of $6.5 \times 10^{-7}$ Ωm or greater, a relative permeability of less than 1.02, and a
(Continued)

melting point lower than that of the electrical steel sheets is used as a welding material.

15 Claims, 3 Drawing Sheets

(51) Int. Cl.
*B23K 9/167* (2006.01)
*B23K 9/00* (2006.01)
*B23K 9/173* (2006.01)
*B23K 35/30* (2006.01)
*H02K 1/18* (2006.01)
*H02K 15/02* (2006.01)
*B23K 101/36* (2006.01)
*B23K 103/04* (2006.01)
*B23K 103/22* (2006.01)

(52) U.S. Cl.
CPC ............ *B23K 9/23* (2013.01); *B23K 35/3066* (2013.01); *H02K 1/185* (2013.01); *H02K 15/02* (2013.01); *B23K 2101/36* (2018.08); *B23K 2103/04* (2018.08); *B23K 2103/22* (2018.08)

(58) Field of Classification Search
CPC ............ B23K 2201/36; B23K 2203/04; B23K 2203/22; H02K 1/185; H02K 15/02
USPC .......................................................... 219/75
See application file for complete search history.

(56) References Cited

U.S. PATENT DOCUMENTS

| | | | |
|---|---|---|---|
| 6,993,822 B2 | 2/2006 | Park et al. | |
| 2007/0215586 A1 | 9/2007 | Graillat et al. | |
| 2008/0240969 A1 | 10/2008 | Kim et al. | |
| 2008/0264924 A1* | 10/2008 | Duncan | B23K 35/0266 219/145.1 |
| 2008/0311413 A1 | 12/2008 | Boehm et al. | |
| 2010/0147818 A1 | 6/2010 | Fondriest | |
| 2011/0248598 A1 | 10/2011 | Utaka | |
| 2012/0055903 A1 | 3/2012 | Izutani et al. | |

FOREIGN PATENT DOCUMENTS

| | | |
|---|---|---|
| CN | 101848964 | 9/2010 |
| CN | 101954525 | 1/2011 |
| CN | 102360778 | 2/2012 |
| JP | 49019078 | 5/1974 |
| JP | 62054594 | 3/1987 |
| JP | 04138893 | 5/1992 |
| JP | 05305466 | 11/1993 |
| JP | 07201616 | 8/1995 |
| JP | 10212553 | 8/1998 |
| JP | 11186059 | 7/1999 |
| JP | 2002209345 | 7/2002 |
| JP | 2002313623 | 10/2002 |
| JP | 2003001486 | 1/2003 |
| JP | 2003136283 | 5/2003 |
| JP | 2005152991 | 6/2005 |
| JP | 2007021516 | 2/2007 |
| JP | 2007270174 | 10/2007 |
| JP | 2009506206 | 2/2009 |
| JP | 2010094686 | 4/2010 |
| JP | 2011036077 | 2/2011 |
| JP | 2011223704 | 11/2011 |
| JP | 2012055899 | 3/2012 |
| JP | 2013009553 | 1/2013 |
| JP | 2005279767 | 10/2015 |
| KR | 20000041634 | 7/2000 |
| KR | 100648616 | 11/2006 |

OTHER PUBLICATIONS

Kaido, et al., The Effect of Short Circuit between Laminated Steel Sheets on the Performance of Lamination Core of Motor, IEEJ Trans. FM, vol. 123, No. 9, 2003, pp. 857-862.
PCT Written Opinion—PCT/KR2013/012120 dated Mar. 25, 2014, citing U.S. Pat. No. 4,114,019, US 2008-0264924, US 2007-0215586, US 2010-0147818 and JP 10-212553.
Chinese Office Action—Chinese Application No. 201380077688.7 dated Jan. 11, 2017, citing U.S. Pat. No. 4,114,019, KR20000041634, JP2013009553, US2010147818, US2007215586, US2008264924, CN101214572, CN101954525, CN102360778, CN1489261 and CN101848964.
Japanese Office Action—Japanese Application No. 2016-523617 dated Dec. 27, 2016, citing JP 49-019078, US 2008/0264924, JP 05-305466, JP 2012-055899, JP 2009-506206, JP 2007-270174, JP 2005-152991, JP 2010-094686 and JP 2003-001486.

* cited by examiner

[Fig. 1]
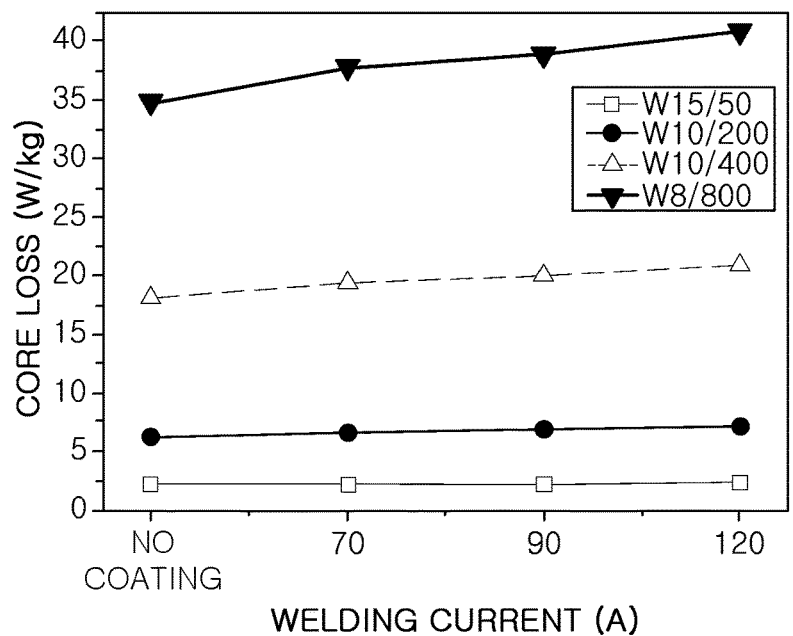
[Fig. 2]
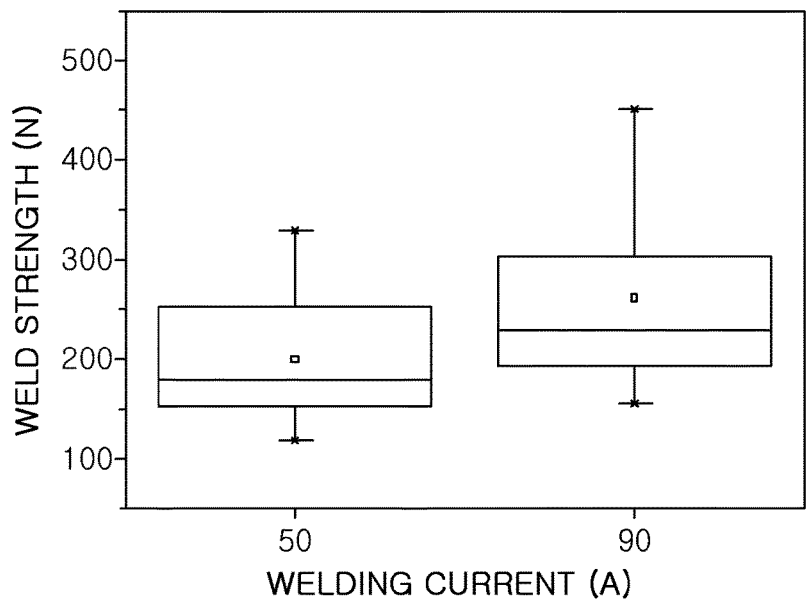

[Fig. 3]
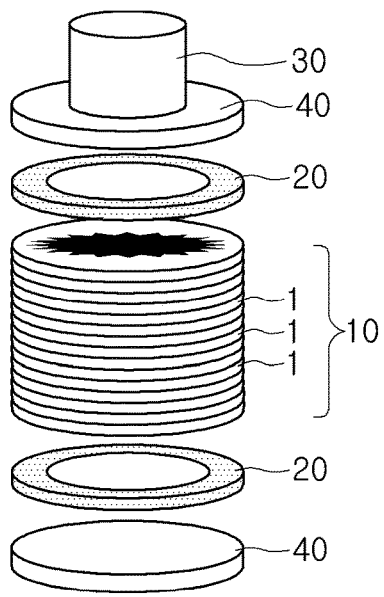
(a)
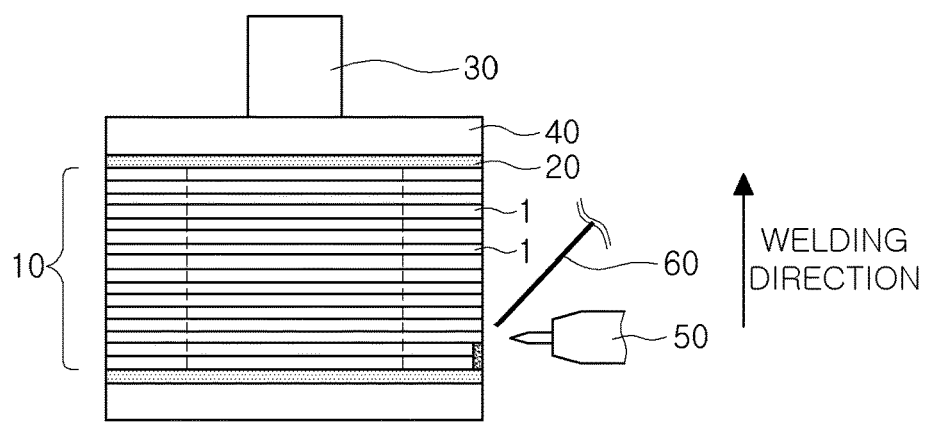
(b)

[Fig. 4]
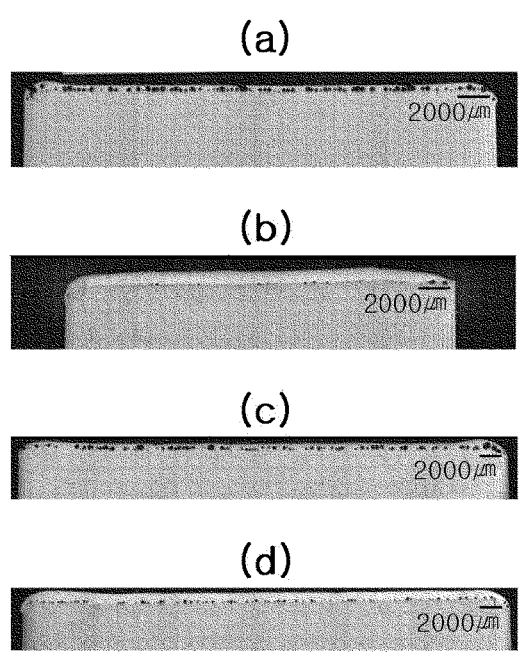

METHOD FOR MANUFACTURING ELECTRICAL STEEL SHEET LAMINATED CORE HAVING REDUCED CORE LOSS AND INCREASED STRENGTH, AND LAMINATED CORE PRODUCED BY THE SAME

TECHNICAL FIELD

The present disclosure relates to a method for manufacturing an electrical steel sheet laminated core having reduced core loss and increased strength, and a laminated core produced using the method.

BACKGROUND ART

Electrical steel sheets include silicon (Si) and have good magnetic characteristics. Such electrical steel sheets are used to form the cores of rotary machines such as motors and generators, and in a core manufacturing process, circular electrical steel sheets having circular center openings are sequentially stacked and welded together.

Electrical steel sheets for forming such laminated cores are coated with an insulation material to reduce eddy current loss in laminated cores, and organic-inorganic composite coating materials in which organic and inorganic substances are combined are widely used for coating such electrical steel sheets, due to punching-process characteristics thereof.

Such an electrical steel sheet laminated core is processed by a mechanical joining method such as clinching or a welding method so as to prevent separation of stacked electrical steel sheets when the laminated core is carried or copper wires are inserted into the laminated core during a manufacturing process. Particularly, when small laminated cores for home appliances or electric vehicles are welded, a tungsten inert gas (TIG) welding method not using a filler metal is used.

However, such a mechanical joining method or welding method results in magnetic loss due to mechanical/thermal strain and core loss due to short circuits between stacked electrical steel sheets.

Although Non-patent Document 1 states that loss caused by short circuits is lower in a clinching method than in a welding method, the clinching method does not guarantee sufficient joining force for large (tall) laminated cores used in high-power/high-efficiency motors of hybrid vehicles or electric vehicles. Therefore, the welding method is still used.

It has been reported that the performance deterioration of laminated cores caused by welding is proportional to the widths and depths of welds affected by the amount of input welding heat or the number of welding points. Therefore, the amount of input welding heat or the number of welding points has to be minimized to reduce performance deterioration. However, there is a limit to reducing the amount of input welding heat or the number of welding points, in the case that large cores are used, to increase the output power of products such as motors. In addition, while plasma or laser welding has been proposed to reduce the amount of input welding heat, such a method has limitations in securely joining electrical steel sheets.

An organic-inorganic composite material coated on electrical steel sheets for insulation may generate gas while decomposing during a welding process, and when molten metal solidifies, such gas may permeate into the metal to cause porous defects in a weld and thus to decrease a joining force.

RELATED ART DOCUMENT

Non-Patent Document (Document 1) IEEJ. Transactions on Fundamentals and Materials, 123(9), 857(2003)

DISCLOSURE OF INVENTION

Technical Problem

Aspects of the present disclosure may include a method for manufacturing a core having reduced core loss and improved strength by stacking and welding electrical steel sheets, and a laminated core manufactured by the method.

Solution to Problem

According to an aspect of the present disclosure, a method for manufacturing an electrical steel sheet laminated core may include: stacking electrical steel sheets to obtain a lamination; and welding an outer surface of the lamination, wherein during the welding, a welding wire having a resistivity of $6.5 \times 10^{-7}$ Ωm or greater, a relative permeability of less than 1.02, and a melting point lower than that of the electrical steel sheets is used as a welding material.

According to another aspect of the present disclosure, an electrical steel sheet laminated core may include: a lamination in which electrical steel sheets are stacked; and a weld formed on an outer surface of the lamination, wherein the weld has a resistivity of $6.5 \times 10^{-7}$ Ωm or greater and a relative permeability of less tan 1.02.

Advantageous Effects of Invention

As set forth above, according to the aspect of the present disclosure, a method for manufacturing an electrical steel sheet laminated core is provided. According to the method, while controlling the magnetic characteristics of a weld and the resistance of short circuit parts caused by welding, thermal stress/strain can be reduced without reducing the joining force of the weld by controlling the rate of input welding heat, and the magnetic characteristics of the laminated core can also be improved.

In addition, since the solidifying point of the weld is lowered, gas generated by decomposition of an insulation coating can be easily discharged, and thus welding defects such as pores and pits can be prevented.

Furthermore, since the laminated core manufactured by the method has high strength and low core loss, the laminated core can be used in small and medium-size products and large products such as large motors and generators as well.

BRIEF DESCRIPTION OF DRAWINGS

FIG. 1 is a graph illustrating a relationship between core loss and welding current in a general tungsten inert gas (TIG) autogenous welding method.

FIG. 2 is a graph illustrating a relationship between weld strength and welding current in a TIG autogenous welding method.

FIGS. 3A and 3B are a perspective view and a sectional view for explaining a method for manufacturing an electrical steel sheet laminated core according to an embodiment of the present disclosure.

FIGS. 4A to 4D are images of pores formed in laminated core samples manufactured according to an embodiment of the present disclosure: Comparative Sample 2, Inventive Sample 1, Comparative Sample 4, and Inventive Sample 2, respectively.

BEST MODE FOR CARRYING OUT THE INVENTION

The inventors have conducted research to find a method of solving the problem of magnetic property deterioration during a welding process for manufacturing a core in which electrical steel sheets are stacked. As a result, the inventors found that magnetic properties of a laminated core in which thin electrical steel sheets are stacked are affected by factors such as short circuits, internal pores, and thermal stress/strain arising when the outer surface of the laminated core is welded.

FIG. 1 is a graph illustrating a relationship between core loss and welding current in a general tungsten inert gas (TIG) autogenous welding method. The data shown in FIG. 1 were measured by ring core test standard IEC60404-06, in which W15/50 denotes a magnetic flux of 1.5 T and a frequency of 50 Hz, W10/200 denotes a magnetic flux of 1.0 T and a frequency of 200 Hz, W10/400 denotes a magnetic flux of 1.0 T and a frequency of 400 Hz, and W8/800 denotes a magnetic flux of 0.8 T and a frequency of 800 Hz.

As illustrated in FIG. 1, core loss (magnetic loss) is proportional to the welding current affecting the amount of input welding heat, and particularly, core loss is high at a high frequency, that is, at a high rotation speed. In other words, if the amount of input welding heat is reduced, core loss may be lowered. The reason for this may be due to reduced thermal stress (strain) during welding and increased electrical resistance by a reduced sectional area of a short-circuit weld.

FIG. 2 is a graph illustrating a relationship between weld strength and welding current in a TIG autogenous welding method which is a general laminated core welding method. The weld strength was obtained by measuring the strength of each electrical steel sheet of a core. The weld strength is illustrated in the form of a box indicating the average and standard deviation of measured values. In each box of the graph, the upper and lower sides denote the third quartile and the first quartile, and the middle line denotes the median value. In addition, the point in the box denotes the average, and the upper and lower lines denote the maximum and minimum values. The rate of welding was 300 mm/min, and the tension speed of a tension tester was 5 mm/min. As illustrated in FIG. 2, when the welding current was reduced to decrease the amount of input welding heat, the weld strength was decreased. That is, if the amount of input welding heat is reduced to decrease core loss as illustrated in FIG. 1, the weld strength is also decreased, which may cause fracturing of welds when laminated cores such as motor cores are carried or processed in the next processes, thereby resulting in safety problems or additional costs for repairs.

That is, while the amount of input welding heat is reduced to decrease core loss, the lower limit of the amount of input welding heat may be set to ensure a certain degree of weld strength. In other words, what is needed is a method for manufacturing a laminated core having high strength and low core loss by using a small amount of input welding heat.

Therefore, the inventors propose a method of minimizing the core loss of a laminated core caused by welding by using a method such as a TIG welding method using a welding wire as a welding material instead of using a general welding-wire welding method. In the TIG welding method using a welding wire as a welding material, the amount of input welding heat can be reduced to the extent of not decreasing the strength of a weld but decreasing thermal stress/strain and increasing the short-circuit resistance of the weld.

An embodiment of the present disclosure provides a method for manufacturing an electrical steel sheet laminated core, the method including: stacking electrical steel sheets to obtain a lamination; and welding an outer surface of the lamination, wherein during the welding, a welding wire having a resistivity of $6.5 \times 10^{-7}$ $\Omega$m or greater, a relative permeability of less than 1.02, and a melting point lower than that of the electrical steel sheets is used as a welding material.

FIGS. 3A and 3B are a perspective view and a sectional view for explaining a method for manufacturing an electrical steel sheet laminated core according to an embodiment of the present disclosure. Hereinafter, the embodiment of the present disclosure will be described in detail with reference to FIGS. 3A and 3B. However, various changes in form and details may be made within the spirit and scope of the present disclosure, and the spirit and scope of the present disclosure are not limited to the embodiment described below. The embodiment is provided to clearly explain the spirit of the present disclosure to those skilled in the art.

As illustrated in FIGS. 3A and 3B, to form a laminated core, a lamination 10 is first formed by stacking electrical steel sheets 1. The electrical steel sheets 1 may be formed by punching a steel sheet strip according to a shape required in a final product such as a motor or transformer. In the embodiment of the present disclosure, the electrical steel sheets 1 are not limited to a particular type. That is, various steel sheets used in the related art may be used the electrical steel sheets 1. In the method for manufacturing an electrical steel sheet laminated core according to the embodiment of the present disclosure, electrical steel sheets not including expensive alloys may be used. That is, low-grade electrical steel sheets may be used instead of using expensive high-grade steel sheets so as to decrease costs. If necessary, electrical steel sheets including expensive alloying elements may be used to increase strength and lower core loss.

Next, the lamination 10 and copper shims 20 are placed between clamping bars 40 connected to a pressing cylinder 30, and the lamination 10 and the copper shims 20 are pressed through the clamping bars 40. After the lamination 10 and the copper shims 20 are pressed at a constant pressure, the lamination 10 is welded using a welding torch 50. At this time, a welding wire 60 may be fed at a constant rate to a front side of the welding torch 50 in a moving direction of the welding wire 60. The welding torch 50 may be moved upward or downward, and the welding wire 60 may be fed to the front side or back side of the welding torch 50 in the moving direction of the welding torch 50. A welding arch starts from and ends with the copper shims 20 used to stably form a weld at start and end positions of the lamination 10. The copper shims 20 may be formed of any other material instead of copper. However, the copper shims 20 may be formed of copper to prevent the copper shims 20 from fusing on the lamination 10. The pressing cylinder 30 may be connected to an electric motor or a hydraulic pressure source for receiving pressure.

In the method for manufacturing a laminated core according to the embodiment of the present disclosure, the welding wire 60 is used as a welding material to reduce thermal strain caused by welding and to form a nonmagnetic weld having high resistivity for reducing the effect of short circuits increasing core loss. Particularly, according to the embodiment of the present disclosure, high strength and low core loss may be guaranteed under the same welding conditions as those of an autogenous welding method. In other words, since the strength of the weld is high even in the case that a low welding current is used as compared with the case of an autogenous welding method, the effect of reducing thermal strain may be additionally obtained. For this, it may be preferable that the welding wire 60 have a resistivity of $6.5 \times 10^{-7}$ Ωm or greater and a relative permeability of less than 1.02. If the resistivity of the welding wire 60 is less than $6.5 \times 10^{-7}$ Ωm, core loss may be increased due to a great influence of short circuits on the weld, and if the relative permeability of the welding wire 60 is 1.02 or greater, nonmagnetic characteristics may not be obtained. More preferably, the resistivity of the welding wire 60 may be $6.9 \times 10^{-7}$ Ωm or greater, much more preferably, $7.2 \times 10^{-7}$ Ωm or greater, most preferably, $7.8 \times 10^{-7}$ Ωm or greater. More preferably, the relative permeability of the welding wire 60 may be 1.01 or less, much more preferably, 1.005 or less, most preferably, 1.003 or less. Since core loss becomes lower as the resistivity of the welding wire 60 increases and the relative permeability of the welding wire 60 decreases, the upper limit of the resistivity and the lower limit of the relative permeability of the welding wire 60 are not limited in the embodiment of the present disclosure. The relative permeability of the welding wire 60 is a value relative to the permeability of air, and is thus dimensionless.

In addition, the welding wire 60 may have a melting point lower than that the electrical steel sheets 1. In general, the melting point of the electrical steel sheets 1 is within the range of about 1466° C. to 1501° C., and during welding, the weld is heated by a welding arc to about 3000° C. As described above, if the melting point of the welding wire 60 is lower than the melting point of the electrical steel sheets 1, that is, if the melting point of the welding wire 60 is lower than 1466° C., it may take more time until the weld solidifies after being melted. That is, a sufficient period of time may be ensured for discharging gas generated by decomposition of an organic material during welding, and thus formation of pores in the weld may be effectively prevented. Preferably, the melting point of the welding wire 60 may be 1454° C. or less, more preferably, 1420° C. or less, most preferably, 1410° C. or less. Since formation of pores is effectively prevented as the melting point of the welding wire 60 is low, the lower limit of the melting point of the welding wire 60 is not limited in the embodiment of the present disclosure.

Since core loss of a laminated core is caused by short circuits during welding, the welding wire 60 may be formed of a nonmagnetic material having high resistivity such as an austenite-containing material. For example, the welding wire 60 may include a material such as an Fe—Cr—Ni-containing alloy, an Fe—Cr—Mn-containing alloy, Ni, a Ni-containing alloy, and TWIP steel. The Fe—Cr—Ni-containing alloy may be 300 series stainless steel, and the Fe—Cr—Mn-containing alloy may be 200 series stainless steel. The 200 series stainless steel and 300 series stainless steel are austenite-containing steels, and in the embodiment of the present disclosure, the welding wire 60 may include such austenite-containing steel. In the embodiment of the present disclosure, the welding wire 60 is not limited to a particular type of the 200 series stainless steel or the 300 series stainless steel. For example, STS 201, STS 202, and STS 205, listed in Korean Industrial Standard KS B ISO14343 as 200 series stainless steel, and STS 308, STS 309, and STS 310, listed in Korean Industrial Standard KS B ISO14343, may be used. In the embodiment of the present disclosure, preferably, the Ni-containing alloy may have a Ni content greater than 25 wt % to have resistivity, relative permeability, and a melting point within the above-mentioned ranges. More preferably, the Ni content of the Ni-containing alloy may be greater than 40 wt %, much more preferably, greater than 50 wt %. The above-mentioned autogenous welding method is a welding method in which only two parts are melted and joined together without using a welding material such as a welding wire.

In the embodiment of the present disclosure, the electrical steel sheets 1 may have an insulation coating thereon for reducing eddy current loss. During a welding process, an organic material included in the insulation coating may decompose to generate gas, and when a molten metal solidifies, the gas may permeate into the metal to cause porous defects in a weld and thus to decrease a joining force. However, according to the embodiment of the present disclosure, since the welding wire 60 containing austenite is used as a welding material, the amount of input welding heat may be reduced to suppress the decomposition of an organic material and the formation of pores in the weld. Particularly, the welding wire 60 may be formed of austenite-containing stainless steel having large amounts of alloying elements as compared with the electrical steel sheets 1 so that the melting point of the welding wire 60 may have a melting point lower than that of the electrical steel sheets 1. Therefore, during welding, the weld may stay in a molten state for a longer time, and thus gas generated by welding heat may fully exit from the weld before the weld solidifies, thereby reducing pores in the weld. In the embodiment of the present disclosure, the insulation coating is not limited to a particular type. In the embodiment of the present disclosure, the insulation coating may be a chromium-free insulation coating for effectively suppressing the formation of pores. Generally, a chromium insulation coating has high heat resistance and decomposes into gas at high temperatures, and thus the gas may not be easily discharged. However, according to the embodiment of the present disclosure, a melted part has a low melting point, and thus there may be a sufficient period of time until the melted part solidifies. Therefore, gas may be effectively discharged.

In the embodiment of the present disclosure, a low-cost TIG welding method, widely used in the related art, may be used. However, other welding methods not using a welding wire, such as laser welding or plasma welding, may be used.

As described above, if the lamination 10 in which the electrical steel sheets 1 are stacked is welded using the welding wire 60 containing austenite, the above-described effects of the embodiment of the present disclosure may be easily obtained. In addition to this, the amount of input welding heat may be controlled.

For example, in the case of using a TIG welding method, the rate of input welding heat may be adjusted to be 0.9 KJ/cm to 2.88 KJ/cm. If the rate of input welding heat is less than 0.9 KJ/cm, the welding wire 60 may not be sufficiently melted due to an insufficient amount of input welding heat, or the electrical steel sheets 1 may not be sufficiently melted in an autogenous welding process. Thus, the bonding force of the weld may be insufficient. If the rate of input welding heat is greater than 2.88 KJ/cm, thermal strain may be high, due to an excessive amount of input welding heat, and thus the lamination 10 may be defectively deformed and may not be used to manufacture a product such as a motor. Therefore, preferably, the rate of input welding heat may be maintained within the range of 0.9 KJ/cm to 2.88 KJ/cm, more preferably, within the range of 0.9 KJ/cm to 2.4 KJ/cm. Since magnetic deterioration caused by welding is increased as thermal stress is increased and short-circuit resistance is decreased in proportional to the rate of input welding heat, it may be much more preferable that the rate of input welding heat be maintained within the range of 0.9 KJ/cm to less than 1.53 KJ/cm. In a general autogenous welding method of the related art, the rate of input welding heat is set to be within the range of 1.53 KJ/cm to 2.88 KJ/cm for obtaining strength equal to or higher than a predetermined level. However, according to the embodiment of the present disclosure, even in the case that a welding current is lower than that in the related art, higher strength may be obtained while markedly reducing core loss.

In the embodiment of the present disclosure, as long as the rate of input welding heat is within the above-mentioned range, any welding current and welding rate conditions may be used without limitations. However, for effectively controlling the rate of input welding heat, it may be preferable that the welding current be set to be within the range of 50 A to 120 A. If the welding current is lower than 50 A, the joining force of the weld may be insufficient, and in some cases, the weld may be fractured. If the welding current is higher than 120 A, thermal stress (thermal strain) may increase or the formation of internal pores may not be securely suppressed due to an excessive amount of input welding heat. Therefore, core loss may not be effectively reduced. Therefore, preferably, the welding current may be maintained within the range of 50 A to 120 A, more preferably, within the range of 50 A to 90 A. The welding current is directly related to the rate of input welding heat. That is, as the welding current is decreased, the rate of input welding heat is also decreased. Therefore, the welding current may be maintained at a low value. Therefore, it may be much more preferable that the welding current be maintained within the range of 50 A to less than 85 A.

In addition, it may be preferable that the speed of welding be within the range of 300 mm/min to 1,000 mm/min. Since the speed of welding is also related to the rate of input welding heat, the speed of welding may be properly adjusted for controlling the rate of input welding heat. If the speed of welding is higher than 1,000 mm/min, pores may be formed in the weld because the speed of welding is excessively high, and thus core loss may be increased. In addition, a sufficient amount of input welding heat may not be applied to the weld, and the weld may be poorly formed. The welding current may be increased to address this situation. In this case, however, associated costs may be increased. On the other hand, if the speed of welding is lower than 300 mm/min, the productivity of a production line may be markedly reduced, and the rate of input welding heat may be increased due to the excessively low speed of welding. For stably feeding the welding wire 60, more preferably, the speed of welding may be within the range of 300 mm/min to 700 mm/min, much more preferably, within the range of 300 mm/min to 500 mm/min.

The diameter of the welding wire 60 may not be specifically limited. However, since the short-circuit resistance is reverse proportional to the size of the weld, the welding wire 60 may have a small diameter. For example, it may be preferable that the diameter of the welding wire 60 be within the range of 0.3 mm to 2.0 mm. If the diameter of the welding wire 60 is smaller than 0.3 mm, the manufacturing cost of the welding wire 60 may be increased. If the diameter of the welding wire 60 is greater than 2.0 mm, the short-circuit resistance may be reduced because the diameter of the welding wire 60 is excessively large, and thus, core loss may be increased. In addition, since the rate of input welding heat has to be increased if the other conditions such as the speed of welding and the feed rate of the welding wire 60 are equal, core loss may be increased because thermal stress may be increased by the rate of welding increase. Thus, it may be preferable that the diameter of the welding wire 60 be within the range of 0.3 mm to 2.0 mm. More preferably, the lower limit of the diameter of the welding wire 60 may be 0.5 mm, much more preferably, 0.8 mm. In addition, more preferably, the upper limit of the diameter of the welding wire 60 may be 1.6 mm, much more preferably, 1.0 mm.

In addition, the feed rate of the welding wire 60 is determined according to the rate of input welding heat and particularly according to the speed of welding. If the feed rate of the welding wire 60 is excessively low as compared with the speed of welding, discontinuous weld beads may be formed, and particularly in the low-rate input welding heat condition proposed by the embodiment of the present invention, locally low-strength regions may be formed, to result in cracking in the laminated core caused by the weight of the laminated core. In addition, if the feed rate of the welding wire 60 is excessively high as compared with the speed of welding, the welding wire 60 may not be sufficiently melted, and thus the weld may be stably formed. Therefore, it may be preferable that the feed rate of the welding wire 60 be 1.5 times to 3.0 times the speed of welding. More preferably, the feed rate of the welding wire 60 may be 1.5 times to 2.0 times the speed of welding.

During welding, the lamination 10 is compressed in the height direction thereof to smoothly perform the welding on the electrical steel sheets 1 of the lamination 10 and to increase the number of the electrical steel sheets 1 of the laminated core (the stacking factor of the laminated core) for improving the performance of a motor using the laminated core. It may be preferable that the compressing pressure be within the range of 0.5 MPa to 3 MPa. If the compressing pressure is lower than 0.5 MPa, the performance of a final product may be low due to a low stacking factor. If the compressing pressure is higher than 3 MPa, gas generated by decomposition of the insulation coating during welding may form many pores in the weld to deteriorate the appearance and strength of the weld. More preferably, the lower limit of the compressing pressure may be 0.8 MPa, much more preferably, 1.2 MPa. In addition, more preferably, the upper limit of the compressing pressure may be 2 MPa, much more preferably, 1.5 MPa.

As described above, according to the method for manufacturing an electrical steel sheet laminated core of the embodiment of the present disclosure, the short-circuit resistance may be controlled even though the rate of input welding heat is equal to that in an autogenous welding method, and thus the effect of reducing core loss may be obtained. In addition, even when the rate of input welding heat is lower than that in an autogenous welding method, higher strength can be obtained while reducing thermal stress/strain and controlling short-circuit resistance, and thus good magnetic characteristics can be obtained.

An embodiment of the present disclosure provides a laminated core produced by the above-described manufacturing method, the laminated core including a lamination in which electrical steel sheets are stacked and a weld formed on an outer surface of the lamination, wherein the weld is formed by using an austenite-containing welding wire as a welding material.

The weld of the laminated core produced by the manufacturing method has a resistivity of $6.5 \times 10^{-7}$ $\Omega$m or greater and a relative permeability of less than 1.02. Since the weld has a resistivity of $6.5\times10^{-7}$ Ωm or greater and a relative permeability of less than 1.02, the short-circuit resistance of the weld can be increased to reduce eddy-current loss. In the embodiment of the present disclosure, since it is preferable that the resistivity of the weld be as high as possible, the upper limit of the resistivity of the weld is not limited.

The weld of the laminated core may have an alloy composition satisfying Formulas 1 and 2 below:

$$y \geq -0.8 \times x + 2.8 \quad \text{[Formula 1]}$$

$$y \geq x - 10 \quad \text{[Formula 2]}$$

where x is Cr+2.5Si+1.8Mo+2Nb, y is Ni+0.5Mn+30C, and Cr, Si, Mo, Nb, Ni, Mn, C are given in weight %.

If the weld of the laminated core does not satisfy Formulas 1 and 2 ($y<-0.8\times x+2.8$ or $y<x-10$), the content of ferrite having magnetic characteristics in the weld may be 10 area % or more, and thus the core loss reducing effect may be cancelled out.

That is, in the embodiment of the present disclosure, the weld of the laminated core may satisfy Formulas 1 and 2, and preferably, the microstructure of the weld may include less than 10 area % of ferrite and austenite as a main structure. More preferably, the content of the ferrite may be less than 5 area %, much more preferably, less than 3 area %. Most preferably, the weld may have an austenite single-phase microstructure.

According to the embodiment of the present disclosure, the electrical steel sheets of the laminated core may have an insulation coating thereon for reducing eddy-current loss. Particularly, the insulation coating may be a chromium-free insulation coating. In this case, the formation of pores may be suppressed more effectively as well.

MODE FOR THE INVENTION

Hereinafter, the embodiments of the present disclosure will be described more specifically through examples. However, the examples are provided for clearly explaining the embodiments of the present disclosure and are not intended to limit the spirit and scope of the present disclosure.

Example 1

A 0.35-mm thick electrical steel sheet strip coated with a chromium-containing insulation material and having 3 wt % of silicon (Si) was punched to form electrical steel sheets, and the electrical steel sheets were stacked to form laminations for motor stators. In a state in which the laminations were compressed to a pressure of 2 MPa by a pressing cylinder, the laminations were welded by a TIG welding method using a welding wire as a welding material. An STS 310 solid wire having a resistivity of $7.8\times10^{-7}$ Ωm, a relative permeability of 1.003, a melting point of 1450 C, and a diameter of 0.9 mm was used as the welding wire. Comparative samples were made using a 50-Kgf grade carbon steel wire having a resistivity of $1.8\times10^{-7}$ Ωm, a relative permeability of 1000, and a melting point of 1529 C as a welding wire. Since the magnetic characteristics of laminated cores are dependent on the stacking factors of the laminated cores, the same number of electrical steel sheets was stacked in each lamination. Four positions of the outer surface of each lamination spaced at 90-degree intervals were welded under welding current conditions illustrated in Table 1. At that time, the speed of welding was 300 mm/min, the feed rate of the welding wire was 700 mm/min, and argon (Ar) was supplied at a rate of 12.5 L/min as protective gas. Laminated core samples made as described above were tested by ring core test standard IEC60404-06 to measure core loss values, and the measured core loss values are illustrated in Table 1. In addition, 15 electrical steel sheets were separated from each laminated core sample, and weld strength was measured for each of the electrical steel sheets. The results thereof are illustrated in Table 1.

TABLE 1

| No. | Welding method | Welding current (A) | Core loss Weld (W/Kg) | | | | strength (N) | |
|---|---|---|---|---|---|---|---|---|
| | | | W15/50 | W10/200 | W10/400 | W8/800 | Average strength | Standard deviation |
| *CS 1 | No welding | — | 2.20 | 6.23 | 18.1 | 34.8 | 0 | 0 |
| CS 2 | Autogenous welding | 50 | 2.25 | 6.51 | 18.8 | 36.8 | 199.5 | 64.4 |
| CS 3 | | 70 | 2.27 | 6.72 | 19.4 | 37.8 | 220.5 | 72.2 |
| CS 4 | | 90 | 2.30 | 6.92 | 20.0 | 38.9 | 261.6 | 96.4 |
| CS 5 | | 120 | 2.35 | 7.19 | 20.9 | 40.8 | Not measured | Not measured |
| **IS 1 | Wire feeding (STS310) | 50 | 2.23 | 6.42 | 18.5 | 36.0 | 532.6 | 125.4 |
| IS 2 | | 70 | 2.26 | 6.61 | 19.1 | 37.0 | 677.6 | 228.5 |
| IS 3 | | 90 | 2.30 | 6.83 | 19.7 | 38.3 | 857.5 | 201.2 |
| CS 6 | Wire feeding (Carbon steel) | 90 | 2.32 | 6.96 | 20.1 | 39.1 | Not measured | Not measured |

*CS: Comparative Sample,
**IS: Inventive Sample

As illustrated in Table 1, Inventive Samples 1 to 3 made under the manufacturing conditions of the present disclosure have core loss values slightly greater than that of Comparative Sample 1 not welded. However, Inventive Samples 1 to 3 have high weld strength of 500 N or greater, and the core loss values of Inventive Samples 1 to 3 are at low levels. Particularly, as compared with Comparative Samples 2 to 5 welded by an autogenous welding of the related art, Inventive Samples 1 to 3 have decreased core loss and markedly increased strength by a factor of 2.5 or more under the same welding current conditions. In addition, the core loss of Inventive Samples 1 to 3 is lower than that of Comparative Sample 6 welded using a carbon steel welding wire.

FIGS. 4A to 4D are images of pores formed in laminated core samples: Comparative Sample 2, Inventive Sample 1, Comparative Sample 4, and Inventive Sample 2, respectively. As illustrated in FIGS. 4A to 4D, while the welding currents were not equal, the formation of internal pores was markedly reduced in the laminated cores welded using an austenite-containing welding wire as a welding material according to the embodiments of the present disclosure as compared with the laminated cores welded by an autogenous welding method.

That is, as proposed in the embodiments of the present disclosure, if an austenite-containing, nonmagnetic/high-resistance welding wire is used, the strength of a weld can be improved while reducing core loss owing to the electrical characteristics of the welding wire, and core loss can be further reduced by lowering the welding current. In addition, since the formation of internal pores is markedly reduced as compared with the case of using an autogenous welding method in the related art, welding defects may also be prevented.

Example 2

A 0.30-mm thick electrical steel sheet strip coated with a chromium-free insulation material and having 3 wt % of silicon (Si) was punched to form electrical steel sheets, and the electrical steel sheets were stacked to form laminations for motor stators. In a state in which the laminations were compressed to a pressure of 0.5 MPa by a pressing cylinder, the laminations were welded by a TIG welding method in the same manner as in Example 1 by using welding wires as a welding material. An STS 310 solid wire having a resistivity of $7.8 \times 10^{-7}$ Ωm, a relative permeability of 1.003, a melting point of 1450° C., and a diameter of 0.9 mm, and an STS 308L solid wire having a resistivity of $7.2 \times 10^{-7}$ Ωm, a relative permeability of 1.004, and a melting point of 1419° C., and a diameter of 0.9 mm were used as the welding wires. The welding current was 50 A, the speed of welding was 300 mm/min, the feed rate of the welding wires was 700 mm/min, and argon (Ar) was supplied at a rate of 12.5 L/min as protective gas. Laminated core samples made as described above were tested by ring core test standard IEC60404-06 to measure core loss values, and the measured core loss values are illustrated in Table 2.

TABLE 2

| No. | Welding method | Welding current (A) | Core loss (W/Kg) | | |
|---|---|---|---|---|---|
| | | | W15/50 | W10/400 | W10/600 |
| *CS 7 | No welding | — | 2.20 | 15.68 | 29.27 |
| CS 8 | Autogenous welding | 50 | 2.57 | 20.53 | 38.40 |
| **IS 4 | Wire feeding (STS310) | 50 | 2.41 | 18.25 | 33.97 |
| IS 5 | Wire feeding (STS308L) | 50 | 2.41 | 18.43 | 34.04 |

As illustrated in Table 2, Inventive samples 4 and 5 made under the manufacturing conditions of the present disclosure have core loss values slightly greater than that of Comparative Sample 7 because of short circuits caused by welding. However, the core loss values of Inventive Samples 4 and 5 are significantly lower than that of Comparative Sample 8 using an autogenous welding method.

The invention claimed is:
1. A method for manufacturing an electrical steel sheet laminated core, the method comprising:
   stacking electrical steel sheets to obtain a lamination; and
   welding an outer surface of the lamination using a welding wire,
   wherein the welding wire has a resistivity of $6.5 \times 10^{-7}$ Ωm or greater, a relative permeability of less than 1.02, and a melting point lower than that of the electrical steel sheets is used as a welding material, and
   wherein the welding is performed by TIG (tungsten inert gas) welding at a rate of input welding heat of 0.9 KJ/cm to 2.88 KJ/cm, at a welding current of 50 A to 120 A, and at a welding speed of 300 mm/min to 1,000 mm/min.
2. The method of claim 1, wherein the welding wire comprises one selected from the group consisting of an Fe—Cr—Ni-containing alloy, an Fe—Cr—Mn-containing alloy, Ni, an Ni-containing alloy, and TWIP (twinning induced plasticity) steel.
3. The method of claim 2, wherein the Fe—Cr—Ni-containing alloy is 300 series stainless steel.
4. The method of claim 2, wherein the Fe—Cr—Mn-containing alloy is 200 series stainless steel.
5. The method of claim 1, wherein the electrical steel sheets comprise a chromium-free insulation coating thereon.
6. The method of claim 1, wherein during the welding, the lamination is compressed in a thickness direction thereof.
7. The method of claim 6, wherein the lamination is compressed by a pressure of 0.5 MPa to 3 MPa.
8. An electrical steel sheet laminated core comprising:
   a lamination in which electrical steel sheets are stacked; and
   a weld formed on an outer surface of the lamination,
   wherein the weld has a resistivity of $6.5 \times 10^{-7}$ Ωm or greater and a relative permeability of less than 1.02, and
   wherein the weld has a weld strength of 500 N or greater.
9. The electrical steel sheet laminated core of claim 8, wherein the weld has an alloy composition satisfying the following formulas:

$$y \geq -0.8 \times x + 2.8 \qquad \text{[Formula 1]}:$$

$$y \geq x - 10 \qquad \text{[Formula 2]}:$$

where x is Cr+2.5Si+1.8Mo+2Nb, y is Ni+0.5Mn+30C, and Cr, Si, Mo, Nb, Ni, Mn, C are given in weight %.
10. The electrical steel sheet laminated core of claim 8, wherein the weld has a microstructure comprising less than 10% of ferrite.
11. The electrical steel sheet laminated core of claim 8, wherein the weld is formed by a welding wire having a melting point lower than that of the electrical steel sheets.
12. The electrical steel sheet laminated core of claim 11, wherein the welding wire comprises at least one selected from the group consisting of an Fe—Cr—Ni-containing alloy, an Fe—Cr—Mn-containing alloy, Ni, an Ni-containing alloy, and TWIP steel.
13. The electrical steel sheet laminated core of claim 12, wherein the Fe—Cr—Ni-containing alloy is 300 series stainless steel.
14. The electrical steel sheet laminated core of claim 12, wherein the Fe—Cr—Mn-containing alloy is 200 series stainless steel.
15. The electrical steel sheet laminated core of claim 8, wherein the electrical steel sheets comprise a chromium-free insulation coating thereon.

* * * * *